United States Patent Office 3,509,215
Patented Apr. 28, 1970

---

3,509,215
ACYL INDAN COMPOUNDS
Thomas F. Wood and John T. Angiolini, Wayne, N.J., assignors to Givaudan Corporation, Clifton, N.J., a corporation of New Jersey
No Drawing. Continuation of application Ser. No. 399,903, Sept. 28, 1964. This application June 15, 1967, Ser. No. 646,187
Int. Cl. A01n 5/00; C07c 49/76
U.S. Cl. 260—592                    8 Claims

ABSTRACT OF THE DISCLOSURE

A novel family of compounds having herbicidal activity, particularly on a pre-emergence basis, is disclosed. These compounds fall within the general formula

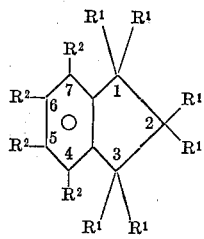

wherein $R^1$ is selected from the group consisting of H and alkyl radicals from 1–3 carbon atoms, with the proviso that at least one of the $R^1$'s is H, and wherein $R^2$ is selected from the group consisting of H, alkyl radicals having from 1 to 6 carbon atoms and acyl radicals derived from alkanoic acids having from 2–5 carbon atoms, with the proviso that at least one of the $R^2$ radicals must be an acyl radical and the maximum number of $R^2$'s which are H is 1, and with the further proviso that if carbons 1 and 3 are both quaternary, then carbons 4 and 7 are both free of an acyl group.

A number of specific compounds as well as processes for their preparation are disclosed.

---

Cross-reference to related U.S. patent application

The present application is a continuation application of our co-pending application, Ser. No. 399,903, filed Sept. 28, 1964, now abandoned.

Background of the invention

This invention relates to novel and useful acyl indan compounds and methods for their preparation.

An object of this invention is the provision of a novel class of compounds having various uses in the arts.

A specific object of this invention is the provision of compounds having effective and superior properties as herbicides.

A further object of the present invention is to provide a process for easily making the novel compounds of this invention in an inexpensive manner from low-cost and readily-available materials.

Summary of the invention

The foregoing and other objects of this invention have been attained by providing compounds which are members of the group encompassed by the following general formula:

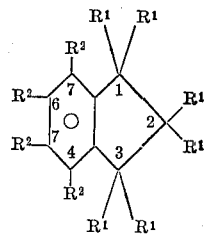

wherein $R^1$ is selected from the group consisting of H and alkyl radicals from 1–3 carbon atoms, with the proviso that at least one of the $R^1$'s is H, and wherein $R^2$ is selected from the group consisting of H, alkyl radicals having from 1 to 6 carbon atoms and acyl radicals derived from alkanoic acids having from 2–5 carbon atoms, with the proviso that at least one of the $R^2$ radicals must be an acyl radical and the maximum number of $R^2$'s which are H is 1, and with the further proviso that if carbons 1 and 3 are both quaternary, then carbons 4 and 7 are both free of an acyl group.

A few examples of compounds within the scope of this invention are the following:

1,1,4,6,7-pentamethyl-5-indanyl ethyl ketone
1,1,2,4,6-pentamethyl-5-indanyl methyl ketone
1,1,3,5,7-pentamethyl-4-indanyl methyl ketone
4,6-diisopropyl-1,1-dimethyl-5-indanyl isopropyl ketone
1,1,4,6-tetramethyl-5-indanyl ethyl ketone
4,6-diisopropyl-1,1-dimethyl-5-indanyl ethyl ketone
1,1,6-trimethyl-4-ethyl-5-indanyl methyl ketone
4-sec.-hexyl-1,1,7-trimethyl-6-isopropyl-5-indanyl methyl ketone
1,1,3,5,7-pentamethyl-3-propyl-6-indanyl methyl ketone and
2-ethyl-1,1,3,3,5,7-hexamethyl-6-indanyl methyl ketone.

The acyl indan derivatives disclosed herein are colorless solids or colorless to pale yellow liquids which have low vapor pressure, boiling mainly within the range of 100° to 160° C. at 2 mm. pressure, good solubility in organic solvents and are for the most part odorless to nearly odorless, although a few have pleasant musk-like odors.

It has been found that the compounds of this invention are useful for various purposes. Some of the compounds have properties making them suitable for use in perfumery, e.g., as musk odorants. Surprisingly, our compounds have been found to possess properties making them suitable as superior, selective, herbicides, particularly on a pre-emergence basis, and as plant growth regulants. The utility of our compounds is enhanced by the fact that, as contrasted to known commercially available herbicides, they do not have objectionable odors, are non-irritating to the skin and have very low toxicity.

The term "pre-emergence" means that the compounds are applied, in known manner, to the soil prior to emergence of the weed species sought to be controlled. As used herein, the term includes the application of a herbicidal compound falling within the scope of this disclosure to areas wherein useful or desirable plants are either growing or have been sown, but where the undesirable plants sought to be controlled have not as yet emerged.

The herbicidal activity of the compounds of the present invention is demonstrated by the following tests. Seeds selected from at least two types of common weed varieties such as wild oats, cheatgrass, foxtail, barnyard grass, crabgrass, nut grass, Johnson grass, curled dock, yellow-rocket, chickweed, pigweed, velvet leaf and lambsquarters were planted in soil under greenhouse conditions. Immediately after planting, the soil surface was sprayed with aqueous suspensions of these compounds so as to supply the equivalent of 16 lbs. of the compound under test per acre of soil surface. The aqueous suspensions were produced by stirring acetone and/or alcohol solutions of these compounds into water. Three weeks after spray application the herbicidal activity of these compounds was determined in comparison with untreated control areas.

All of the compounds exhibit beneficial pre-emergence herbicidal activity against noxious weeds and grasses; some inhibit germination of only certain weed and grass species; others exhibit a broader spectrum of inhibition. In other words, a high degree of selectivity is shown by this family. For this reason these compounds are of great value in the elimination of weeds and grasses from economic crops such as corn, beans, soybeans, rice and others; some individual members being especially effective in certain specific crops.

Prior art

British Patents, Nos. 796,585 and 796,586, issued to L. Givaudan & Cie, S.S., Vernier, Geneva, Switzerland, represent the closest known compounds to those disclosed and claimed herein. The British patents disclose compounds which are lower homologs of the compounds herein claimed. Surprisingly, the compounds of the present invention, unlike those of the British patents, demonstrate practical utility as herbicides.

Further detailed description of the invention

In preparing the novel compounds of this invention the polyalkyl indan hydrocarbons corresponding to the novel acyl compounds are first prepared, and then acylated.

Various procedures lend themselves to the preparation of the so-called parent indan hydrocarbons. The following procedures may be mentioned:

(1) Di- and tri-alkylation of indans: Direct polyalkylation of indan can be carried out in the conventional manner using regular Friedel-Crafts catalysts or protonic acid alkylation catalysts (e.g. $H_2F_2, H_3PO_4, H_2SO_4$). For example 4,5,6-tri-isopropylindan and di-sec. butylindan are prepared by the procedure of Pokrovskaya and co-workers. E. S. Pokrovskaya and T. G. Stepantseva, J. Gen. Chem. U.S.S.R., 9, 1953 (1939); ibid., Tr. Inst. Nefti, Akad. Nauk U.S.S.R., 1, No. 2, 300 (1950). E. S. Pokrovskaya and R. Y. Sushchik, J. Gen. Chem. U.S.S.R., 9, 2291 (1939); Patinkin, S. H. and B. S. Friedman, Friedel-Crafts and Related Reactions, vol. II, Part I, Interscience Publishers, New York, pages 72–3 (1964).

(2) Reduction of 1-indanones: This general reaction for the preparation of indans is carried out as follows:

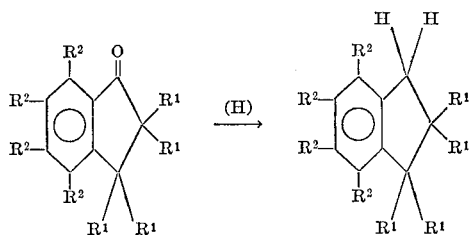

The reduction may be carried out by the following methods:

(a) Reduction by zinc and hydrochloric acid (Clemmensen).

(b) Reduction of hydrazine in the presence of a base (Wolff-Kishner). For example see Ferrero and Helg., Helv. Chim. Acta, 42, 2111 (1959).

(c) Catalytic hydrogenation.

The methods of reducing carbonyls are well-known procedures familiar to chemists skilled in the art and need not be discussed further.

The 1-indanones required are readily obtained by the procedures previously reported in the literature.

(a) The combination acylation-alkylation procedure of Hart and Tebbe, J. Am. Chem. Soc., 72, 3286 (1950) results in 1-indanone derivatives of the types needed. For example from p-xylene there is obtained:

4,7 - dimethyl - 1 - indanone, 2,4,7 - trimethyl-1-indanone, 3,4,7-trimethyl-1-indanone, etc.

Similarly, many other homologs may be prepared starting with other di- or tri-substituted benzenes using many different cyclialkylation agents. J. Colonge and L. Pichat, Bull. Soc. Chim. 1949, 423, describe the preparation of 3,3,5,7-tetramethyl-1-indanone from metaxylene and dimethylacrylic acid.

(3) Cyclodehydration method:

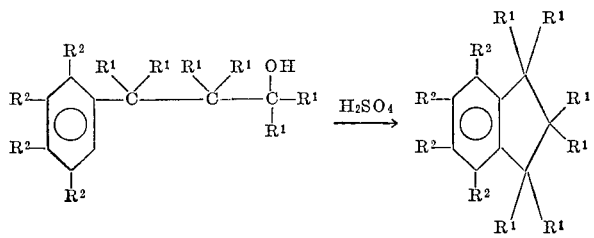

This method is the most versatile of all for the preparation of substituted indans. It was first extensively investigated by R. O. Roblin, Jr., D. Davidson and M. T. Bogert, J. Am. Chem. Soc., 57, 152 (1935), who prepared 1-methyl-1-ethylindan, 1,1,2-trimethylindan, 1,1-dimethylindan, 1,1,3-trimethylindan and 1,1,3,3-tetramethylindan. Since this early work the method has been extensively used by others. For example, L. I. Smith and L. J. Spillane (J. Am. Chem. Soc., 65, 207 (1943)) prepared 1,1,3,3,4,6-hexamethylindan by the cyclo-dehydration technique. Weber and co-workers have synthesized 1,1,3,5 - tetramethyl - 3 - n - propylindan and 1,1,3,5-tetramethyl-3-isobutylindan.

(4) Cyclo-addition of olefins to styrenes: This general method for the preparation of polyalkylated indans by reaction of styrenes and olefins in the presence of sulfuric acid was disclosed in U.S. Patent 2,851,501.

Polyalkylindans useful for preparing acyl derivatives of herbicidal value may be similarly obtained by employing suitable substituted styrenes and olefins: For example:

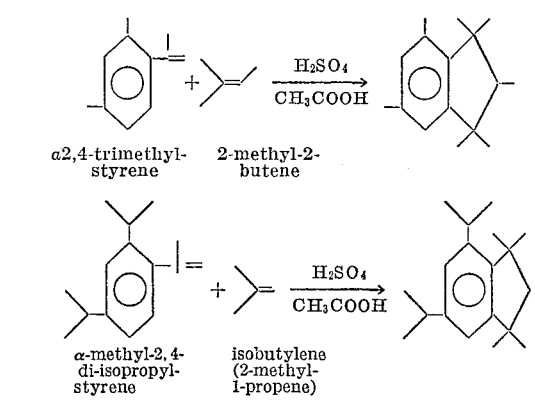

α2,4-trimethyl-styrene    2-methyl-2-butene

α-methyl-2,4-di-isopropyl-styrene    isobutylene (2-methyl-1-propene)

(5) Cyclo-addition of olefins to suitably substituted p-Cymylcarbonium ions: Polyalkyl indans useful for the preparation of the herbicidally active acyl derivatives may be prepared as follows:

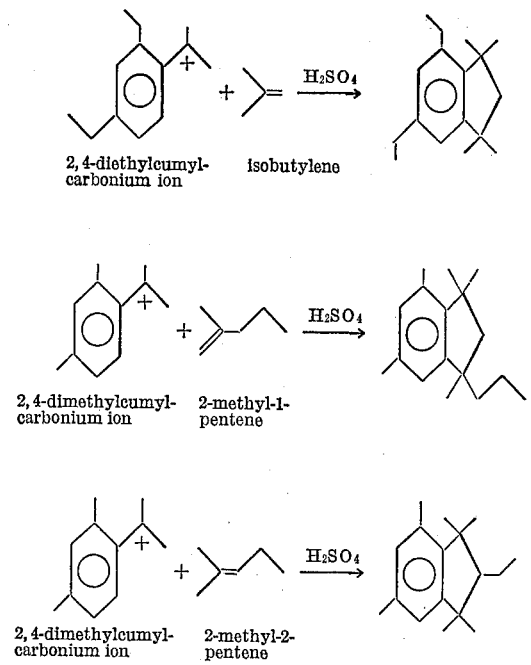

2,4-diethylcumyl-carbonium ion  isobutylene 2,4-dimethylcumyl-carbonium ion  2-methyl-1-pentene 2,4-dimethylcumyl-carbonium ion  2-methyl-2-pentene (6) Hydrogenation of substituted indenes:

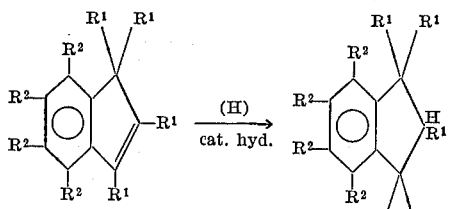

(7) Indans by cyclo-addition of 1,3-butadienes to aromatic hydrocarbons: A one-step method for the preparation of polyalkylated indans was developed by the present inventors and is disclosed in our U.S. Patents Nos. 3,152,192 and 3,240,829. The latter patent was issued on an application which was a continuation application of Ser. No. 65,261 and of Ser. No. 65,290, both filed on Oct. 27, 1960.

This novel reaction may be outlined as follows:

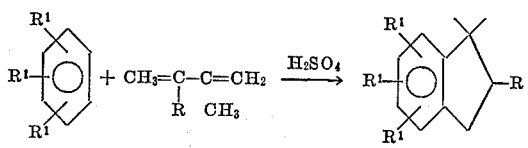

where R=H or $CH_3$ and $R^1$=H or alkyl radicals of 1 to 6 carbon atoms.

As above mentioned, the novel acyl compounds of this invention are prepared by acylating the parent polyalkyl indan hydrocarbons above mentioned. Acylating procedures employed are those which are more or less conventional, involving the use of acid chlorides or anhydrides treated with a "Lewis acid." Anhydrous aluminum chloride is presented preferred.

A general procedure for making the ketone derivatives which gives good results is the following:

A solution of 1 mole of the hydrocarbon and 1.1 moles of the acyl chloride (acetyl, propionyl, isobutyryl, etc.) is added dropwise during the course of 30 to 60 min. to a suspension of 1.15 to 1.20 moles of ground (small granules) anhydrous aluminum chloride in ethylene dichloride solvent with stirring at 20–25°. After stirring 1 hr. longer at 25° the batch is quenched and worked up in the usual manner. Other solvents suitable for use in the Friedel-Crafts acylation reaction are $CS_2$, petroleum ether, methylene chloride, carbon tetrachloride, nitrobenzene and nitromethane. We prefer to use ethylene dichloride although carbon tetrachloride and methylene chloride are almost as satisfactory.

In cases where the substituted polyalkylindan to be acylated contains labile groups which readily undergo migration or dealkylate, we prefer to acylate at around 0° using a preformed complex of aluminum chloride and the acid chloride in carbon tetrachloride or ethylene dichloride to which the hydrocarbon is added over a 2 to 4 hr. period.

While the above procedures are preferred, it is possible to change the ratio of reactants and still get good results. However, in order to fully utilize the acylating agent the molar ratio of aluminum chloride to acid chloride must be at least 1:1, and 2:1 when the acid anhydride is used instead of the chloride. An excess of the indan hydrocarbon can be used, even enough to serve as reaction solvent. This modification is usually inadvisable since it offers no advantage over the use of the usual inexpensive Friedel-Crafts solvents which have greater solution power. These solvents can be used in the varying amounts needed to provide good stirring.

Time for carrying out the acylating procedure may vary from 1 to 10 hours or more depending on the individual case. Completion of the reaction is shown when HCl gas stops coming from the reaction. Temperature range can be from −30 to 60°. The preferred range is 0 to 25°.

The invention is further illustrated by the following examples, without, however, limiting it to them. The temperatures given in this specification are in degrees centigrade unless otherwise stated. All melting points and boiling points are uncorrected. Infrared spectra were all determined with a Perkin Elmer Model 21 Infrared Spectrophotometer.

EXAMPLE 1

1,1,4,6,7-pentamethyl-5-indanyl methyl ketone

Into a vigorously-agitated suspension of 185 g. of 93% sulfuric acid and 400 g. of 1,2,4-trimethylbenzene (pseudocumene), chilled to −5° C., there was added dropwise over a 4½ hour period a solution of 68 g. isoprene (1 mole) and 118 g. of 1,2,4-trimethylbenzene keeping the temperature at −6 to 0° C. After stirring 40 minutes longer after the addition, the mixture was allowed to settle. The lower sulfuric acid layer was separated (212 g.). The remaining oil layer was washed successively with water (200 ml.), 5% aqueous caustic soda solution (200 ml.), and 5% aqueous sodium bicarbonate solution (200 ml.). The excess 1,2,4-trimethylbenzene was distilled off under reduced pressure (323 g. recovered) and the residual liquid was subjected to high vacuum distillation to yield 132 g. of the desired condensation product, B.P. 87–90° C. (1 mm.), which rapidly solidified. Recrystallization from 300 g. of ethyl alcohol yielded 102 g. of 1,1,4,6,7-pentamethylindan, M.P. 75–76° C. The infrared absorption spectrum of this hydrocarbon shows a band at 7.62 microns which is characteristic for the indan structure.

*Analysis.*—Calcd. for $C_{14}H_{20}$ (percent): C, 89.29; H, 10.71. Found (percent): C, 89.05; H, 10.57.

The acetyl derivative, 1,1,4,6,7-pentamethyl-5-indanyl methyl ketone, was prepared by the following procedure. A solution of 94 g. (0.5 mole) of 1,1,4,6,7-pentamethylindan in 150 ml. of carbon tetrachloride was added dropwise to a cold (0° C.) solution of 79.8 g. (0.6 mole) anhydrous aluminum chloride and 47.5 g. (0.6 mole) of acetyl chloride in 500 ml. carbon tetrachloride over a period of 2½ hours while the temperature was kept at 1 to 3° by cooling. After the feed was complete, stirring within the same temperature range was continued for 2½ hours longer. The batch was then quenched into a well-stirred mixture of 500 g. of crushed ice and 250 g. of ice-water. After being allowed to settle, the lower carbon tetrachloride solution was separated and washed successively with water (2× 500 ml. portions), 5% sodium carbonate (2× 250 ml.) and again with 500 ml. of water. The crude product (137 g.) which remained after distillation of the carbon tetrachloride solvent rapidly crystallized. Crystallization from 150 g. ethanol gave 88 g. of colorless product, M.P. 64–65°, which proved effective as a selective herbicide and plant-growth regulant.

*Analysis.*—Calc'd for $C_{16}H_{22}O$ (percent): C, 83.43; H, 9.63. Found (percent): C, 83.44; H, 9.27.

EXAMPLE 2

4,6-diisopropyl-1,1-dimethyl-5-indanyl methyl ketone and isomer

Into a vigorously-agitated suspension of 400 g. 93% sulfuric acid and 1,000 g. diisopropylbenzene (Dow Chem. Co. commercial grade) cooled to −4° C., there was slowly added dropwise a solution of 150 g. isoprene in 200 g. diisopropylbenzene over a 4½ hour period while the temperature was kept at −4 to 0° C. Stirring was continued for 40 minutes after the feed. The mixture was allowed to settle and the lower sulfuric acid layer (450 g.) separated. The remaining oil layer was washed successively with water (200 ml.), 5% caustic soda solution (100 ml.) and 5% sodium bicarbonate solution (200 ml.). The excess diisopropylbenzene was distilled off at 2 mm. and the desired 4,6-diisopropyl-1,1-dimethylindan and isomers was obtained as a colorless liquid, B.P. 89–94° C. (1 mm.), $n_D^{20}$ 1.5075, sp. gr. 25/25° 0.8971, amounting to 314 g.

*Analysis.*—Calc'd. for $C_{17}H_{26}$ (percent): C, 88.62; H, 11.38. Found (percent): C, 88.68; H, 11.60.

The dinitro derivative prepared in the usual manner using mixed acid was obtained as a light yellow, odorless solid, M.P. 105–106° C.

The hydrocarbon product was acetylated using the same general technique as described above in Example 1, except that ethylene dichloride was substituted for carbon tetrachloride. From 690 g. of the hydrocarbon product there was obtained 637 g. of derivative, B.P. 130–132° C. (2 mm.), a colorless material, which solidified in the receiver during vacuum-distillation. This solid exhibited a mild musk-like odor and had a congealing point of 46.6° to 50.6° C. Its alcoholic solution was clear. Vapor-phase chromatograms showed two main components with minor amounts of impurities. The major component was estimated to make up 55% of the product. After study of the infrared spectrogram of the product and the parent hydrocarbon, the structure 4,6-diisopropyl-1,1-dimethyl-5-indanyl methyl ketone was assigned to this component. The other component is the isomer, 4,6-diisopropyl-1,1-dimethyl-7-indanyl methyl ketone.

After one crystallization from methanol there was obtained a colorless solid, M.P. 74–75°, which still had a mild musk-like odor.

*Analysis.*—Calc'd. for $C_{19}H_{28}O$ (percent): C, 83.77; H, 10.36. Found (percent): C, 83.41; H, 10.04.

The vacuum-distilled grade, as well as the crystallized product, is quite satisfactory for use as a herbicidal agent or as a plant-growth regulant.

EXAMPLE 3

4,6-diisopropyl-1,1-dimethyl-5-(and 7)-indanyl ethyl ketones 4,6-diisopropyl-1,1-dimethylindan, prepared as in Example 2 above, was reacted with propionyl chloride using the general acylation procedure of Example 1, except that ethylene dichloride was substituted for carbon tetrachloride. From 575 g. of the hydrocarbon there was obtained 636 g. of vacuum-distilled ketone, a nearly colorless product, B.P. 132–133° at 2 mm. This solidified to a white waxy material after distillation, congealing point 84° C. and melting point 88°. Upon crystallization from methanol the product was obtained as a white powder, M.P. 78–88° C. Analysis by vapor-phase chromatography showed the presence of two isomers, one amounting to 55% and the other 45%. The crystallized and vacuum-distilled grades of the mixture were equally effective as herbicides. The crystallized product was analyzed as follows:

*Analysis.*—Calc'd. for $C_{20}H_{30}O$ (percent): C, 83.86; H, 10.56. Found (percent): C, 84.35; H, 11.10.

The isomeric mixture was subjected to chromatographic resolution to separate the isomers. The major component was obtained in 98% purity and melted at 116–118°. The other, obtained in 96% purity melted at 92–94°. Based on infrared and n.m.r. studies the high melting isomer was assigned the structure 4,6-diisopropyl-1,1-dimethyl-5-indanyl ethyl ketone and the other 4,6-diisopropyl-1,1-dimethyl-7-indanyl ethyl ketone. The infrared spectrum of the high-melting isomer shows the following principal characteristic band (KBr pellet): 3.37 s., 5.86 s., 6.84 s., 7.12 m., 7.23 m., 7.325 m., 7.41 m., 7.48 m.w., 8.07 m.w., 8.20 s., 8.54 m.w., 9.03 s., 9.30 m.w., 9.70 m., 10.13 w., 10.62 m.w., 11.02–12 w., 11.36 m., 11.88 w., 12.38 w. microns.

The infrared spectrum of the low-melting isomer M.P. 92–94° shows the following principal characteristic bands: (KBr pellet) 3.37 s., 5.88 s., 6.23 m.w., 6.85 s., 7.13 m., 7.25 m.s., 7.34 m. 7.41 m.w., 7.48 m., 7.60 m.w., 7.78 w., 8.03 m.w., 8.27 m.s., 7.57 w., 8.85 w., 9.03 m., 9.18 s., 9.57 m., 9.75 w., 10.07 w., 10.27 w., 10.68 m.w., 11.05 s., 11.48 m.w., 11.85 w., 12.28 w., 12.72 m.w., 12.96 w. microns.

The infrared spectrum of the isomeric mixture, B.P. 132–133° (2 mm.) shows the following principal characteristic bands (melt in demountable cell): 3.41 s., 5.88 s., 6.25 m.w., 6.38 w., 6.86 s., 7.11 m., 7.26 m., 7.34 m.s., 7.48 m., 8.08 m., 8.23–28 m., 8.57 w., 9.05 m.s., 9.20 m., 9.73 m.w., 10.15 w., 10.68 m.w., 11.05–11.14 w., 11.38 m., 11.90 w., 12.38 m.w., 12.73 w. microns. The pure isomers were equally effective as herbicides.

In similar manner, a number of homologs of the compounds described in these examples were prepared, and found to be effective as pre-emergence herbicides and plant-growth-regulants. As will now be understood by those skilled in the art, these were all synthesized by the same general method from readily available raw materials: isoprene, (in three cases 2,3-dimethyl-butadiene was used instead), o,m,p-xylenes, m,p-cymenes, p-ethylcumene, diisopropylbenzenes, isopropylxylenes, pseudocumene, triisopropylbenzenes, ethyltoluenes, di- and tri-ethylbenzenes and the acid chlorides of acetic, propionic, butyric and isobutyric acids. Table I gives the formulae and physical and chemical constants of the homologs thus prepared.

TABLE I.—INDANYL KETONES

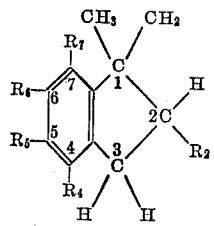

| Ex. No. | Formula | $R_2$ | $R_4$ | $R_5$ | $R_6$ | $R_7$ | B.P., °C. (mm.) | $n_D^{20}$ or M.P., °C. | Calculated C | Calculated H | Found C | Found H |
|---|---|---|---|---|---|---|---|---|---|---|---|---|
| 4 | $C_{15}H_{20}O$ | H | $CH_3$ | $CH_3C=O$ | $CH_3$ | H | 120 (2) | 1.5284 | 83.28 | 9.32 | 83.56 | 9.57 |
| 5 | $C_{15}H_{20}O$ | H | $CH_3C=O$ | $CH_3$ | $CH_3$ | H | 116–120 (2) | 1.5359 | 83.28 | 9.32 | 83.69 | 9.44 |
| 6 | $C_{15}H_{20}O$ | H | $CH_3$ | H | $CH_3C=O$ | $CH_3$ | 121–125 (2) | 1.5450 | 83.28 | 9.32 | 83.69 | 9.51 |
| 7 | $C_{16}H_{22}O$ | H | $CH_3$ | $CH_3C=O$ | $C_2H_5$ | H | 120 (2) | 1.5270 | 83.43 | 9.63 | 83.70 | 9.49 |
| 8 | $C_{16}H_{22}O$ | H | $CH_3$ | $C_2H_5C=O$ | $CH_3$ | H | 125 (2) | 1.5281 | 83.43 | 9.63 | 83.67 | 9.64 |
| 9 | $C_{16}H_{22}O$ | H | $CH_3$ | $C_2H_5C=O$ | H | $CH_3$ | 134–138 (2) | 1.5370 | 83.43 | 9.63 | 83.20 | 9.67 |
| 10 | $C_{16}H_{22}O$ | H | $C_2H_5C=O$ | $CH_3$ | $CH_3$ | H | 121–125 (2) | 1.5303 | 83.43 | 9.63 | 82.75 | 9.67 |
| 11 | $C_{16}H_{22}O$ | $CH_3$ | $CH_3$ | $CH_3C=O$ | $CH_3$ | H | 125 (2) | 1.5265 | 83.43 | 9.63 | 82.36 | 9.38 |
| 12 | $C_{16}H_{22}O$ | $CH_3$ | $CH_3C=O$ | $CH_3$ | $CH_3$ | H | 125–130 (2) | 1.5322 | 83.43 | 9.63 | 83.38 | 9.70 |
| 13 | $C_{17}H_{24}O$ | H | $CH_3$ | $CH_3C=O$ | $i$-$C_3H_7$ | H | 116 (1.2) | 68.5–69 | 83.55 | 9.90 | 84.03 | 9.70 |
| 14 | $C_{17}H_{24}O$ | H | $CH_3$ | $CH_3C=O$ | H | $i$-$C_3H_7$ | 137 (1.3) | 71–72.5 | 83.55 | 9.90 | 83.58 | 9.69 |
| 15 | $C_{17}H_{24}O$ | H | $C_2H_5$ | $CH_3C=O$ | H | $C_2H_5$ | 117–118 (2) | 1.5232 | 83.55 | 9.90 | 83.33 | 9.62 |
| 16 | $C_{17}H_{24}O$ | H | $CH_3$ | $C_3H_7C=O$ | $CH_3$ | H | 133 (2) | 1.5205 | 83.55 | 9.90 | 83.64 | 9.78 |
| 17 | $C_{17}H_{24}O$ | H | $CH_3$ | $i$-$C_3H_7$—$C=O$ | $CH_3$ | H | 127–129 (2) | 1.5231 | 83.55 | 9.90 | 84.34 | 9.82 |
| 18 | $C_{17}H_{24}O$ | H | $CH_3$ | $C_3H_7C=O$ | H | $CH_3$ | 138–140 (2) | 1.5324 | 83.55 | 9.90 | 83.53 | 9.95 |
| 19 | $C_{17}H_{24}O$ | H | $CH_3$ | $i$-$C_3H_7$—$C=O$ | H | $CH_3$ | 133 (2) | 1.5298 | 83.55 | 9.90 | 83.74 | 9.74 |
| 20 | $C_{17}H_{24}O$ | H | $C_3H_7$—$C=O$ | $CH_3$ | $CH_3$ | H | 133–137 (2) | 1.5256 | 83.55 | 9.90 | 83.17 | 9.81 |
| 21 | $C_{17}H_{24}O$ | H | $i$-$C_3H_7$—$C=O$ | $CH_3$ | $CH_3$ | H | 129–132 (2) | 1.5248 | 83.55 | 9.90 | 82.86 | 9.77 |
| 22 | $C_{17}H_{24}O$ | H | $CH_3$ | $C_2H_5C=O$ | $CH_3$ | $CH_3$ | 140 (2) | 1.5255 | 83.55 | 9.90 | 83.52 | 9.74 |
| 23 | $C_{18}H_{26}O$ | $CH_3$ | $CH_3$ | $CH_3C=O$ | H | $i$-$C_3H_7$ | 143–145 (1.5) | 55–56 | 83.66 | 10.14 | 83.52 | 9.99 |
| 24 | $C_{18}H_{26}O$ | H | $C_2H_5$ | $CH_3C=O$ | H | $i$-$C_3H_7$ | 128–129 (1) | 1.5302 | 83.66 | 10.14 | 83.32 | 9.89 |
| 25 | $C_{18}H_{26}O$ | H | $CH_3$ | $CH_3C=O$ | $i$-$C_3H_7$ | $CH_3$ | 127–128 (1) | 1.5443 | 83.66 | 10.14 | 82.57 | 9.28 |
| 26 | $C_{18}H_{26}O$ | H | $CH_3$ | $CH_3C=O$ | $CH_3$ | $i$-$C_3H_7$ | 118–119 (1) | 1.5300 | 83.66 | 10.14 | 83.06 | 9.37 |
| 27 | $C_{18}H_{26}O$ | H | $i$-$C_3H_7$ | $CH_3C=O$ | $CH_3$ | $CH_3$ | 127–130 (1) | 1.5367 | 83.66 | 10.14 | 82.68 | 9.60 |
| 28 | $C_{18}H_{26}O$ | H | $CH_3$ | $C_3H_7C=O$ | $CH_3$ | $CH_3$ | 150 (2) | 1.5278 | 83.66 | 10.14 | 82.67 | 9.88 |
| 29 | $C_{18}H_{26}O$ | H | $CH_3$ | $i$-$C_3H_7$—$C=O$ | $CH_3$ | $CH_3$ | 144 (2) | 1.5322 | 83.66 | 10.14 | 83.24 | 9.84 |
| 30 | $C_{19}H_{28}O$ | H | $C_2H_5$ | $CH_3C=O$ | $C_2H_5$ | $C_2H_5$ | 139–140 (2) | 1.5275 | 83.77 | 10.36 | 83.46 | 10.12 |
| 31 | $C_{21}H_{32}O$ | H | $i$-$C_3H_7$ | $C_3H_7C=O$ | $CH_3$ | H | 139–140 (2) | 68–67 | 83.94 | 10.73 | 84.18 | 10.51 |
| 32 | $C_{21}H_{32}O$ | H | $i$-$C_3H_7$ | $i$-$C_3H_7C=O$ | $i$-$C_3H_7$ | H | 133–135 (2) | 48–55 | 83.94 | 10.73 | 83.97 | 10.52 |
| 33 | $C_{17}H_{24}O$ | H | $CH_3$ | $C_2H_5C=O$ | $C_2H_5$ | H | 126 (2) | 1.5225 | 83.55 | 9.90 | 83.29 | 9.79 |
| 34 | $C_{18}H_{26}O$ | H | $C_2H_5$ | $C_2H_5C=O$ | $C_2H_5$ | H | 131–132 (2) | 1.5203 | 83.66 | 10.14 | 83.22 | 10.13 |
| 35 | $C_{18}H_{26}O$ | H | $CH_3$ | $C_2H_5C=O$ | $i$-$C_3H_7$ | H | 132 (2) | 63–64 | 83.66 | 10.14 | 83.64 | 10.22 |

The compound of Example 35, namely, 1,1,4-trimethyl-6-isopropyl-5-indanylethyl ketone, was prepared as follows:

6-isopropyl-1,1,4-trimethylindan (U.S. Patent 3,240,829, Example 16), 101 g., was added dropwise to a cold (0°) solution of 70 g. of anhydrous aluminum chloride and 53 g. of propionyl chloride in 200 g. of ethylene dichloride over a period of 2½ hours while the temperature was kept at −1° to +1°. After the addition was completed, stirring within the same temperature range was continued for 1¼ hours longer. The batch was then quenched into a well-stirred mixture of crushed ice and water (300 g.). After settling, the ethylene dichloride solution was separated and washed successively with 300 g. portions of 10% hydrochloric acid, 10% sodium hydroxide solution and 10% bicarbonate of soda solution and then filtered. Vacuum-distillation yielded the desired product as a viscous liquid, B.P. 132° (2 mm.) which congealed on standing. The yield was 115 g. After being crystallized once from methanol the product melted at 63–64°. Analytical data are given in Table I (Example 35) and infrared absorption data in Table II (Example 35).

The vacuum-distilled grade, as well as the crystallized product, exhibits excellent herbicidal activity for the control of grasses.

Additional illustrations showing the preparation of certain of our novel compounds are given in Examples 36 to 40.

EXAMPLE 36

1,4-dimethyl-1-ethyl-7-isopropyl-5-indanyl methyl ketone 3-methyl-1-penten-3-ol (Air Reduction Chemical Co.) was dehydrated by the procedure of U.S. Patent 2,381,148 to produce a mixture of 3-methyl-1,3-pentadiene and 2-ethyl-1,3-butadiene, B.P. 114–118°. Cyclo-addition of this mixture to p-cymene following the general diolefin-hydrocarbon condensation procedure, as illustrated in Examples 1 and 2, produced 1,4-dimethyl-1-ethyl-7-isopropylindan, a colorless liquid, B.P. 93–98°, $n_D^{20}$ 1.5146. The indan hydrocarbon derivative, thus produced, was acetylated by the general method of Example 1 to produce the ketone derivative, 1,4-dimethyl-1-ethyl-7-isopropyl-5-indanyl methyl ketone, a pale yellow liquid, B.P. 137–139° (2 mm.), $n_D^{20}$ 1.5336, which had a pleasant moderately strong musk-like odor and was found to be an effective pre-emergence herbicide and plant growth regulant.

EXAMPLE 37

4,6-dimethyl-5-indanyl methyl ketone 5,7-dimethyl-1-indanone was prepared by the combination acylation-alkylation reaction between meta xylene and β-chloropropionyl chloride using the general procedure described by Hart and Tebbe (J. Am. Chem. Soc., 72, 3286 (1950)) in their preparation of 4,7-dimethyl-1-indanone from para xylene. The ketone was obtained as a colorless solid, M.P. 76–79°.

The ketone was reduced by the Wolff-Kishner method (Huang-Minlon modification) using 85% hydrazine hydrate, diethylene glycol solvent and caustic soda flakes to produce the corresponding hydrocarbon, 4,6-dimethylindan, a colorless liquid, B.P. 61° (2 mm.), $n_D^{20}$ 1.5325.

Acetylation of the above hydrocarbon by the method of Example 1, using ethylene dichloride solvent, gave a 95% yield of 4,6-dimethyl-5-indanyl methyl ketone, a colorless liquid, B.P. 106° (2 mm.), $n_D^{20}$ 1.5459. This ketone showed activity as a pre-emergence herbicide.

*Analysis.*—Calcd. for $C_{13}H_{16}O$ (percent): C, 82.93; H, 8.57. Found (percent): C, 83.41; H, 8.79.

EXAMPLE 38

4,6,7-trimethyl-5-indanyl methyl ketone

In similar fashion, starting with pseudocumene(1,2,4-trimethyl-benzene), the following compounds were prepared:

(a) 4,5,7-trimethyl-1-indanone, a colorless solid, M.P. 111–113°.

(b) 4,5,7-trimethylindan, a colorless material, B.P. 79° (1 mm.), which solidified immediately after distillation, M.P. 46–47°.

(c) 4,5,7-trimethyl-6-indanyl methyl ketone, a colorless solid, M.P. 62–64° (from methanol). This compound was active as a pre-emergence herbicide.

*Analysis.*—Calcd. for $C_{14}H_{18}O$ (percent): C, 83.12; H, 8.97. Found (percent): C, 83.69; H, 9.16.

EXAMPLE 39

5,6-diisopropyl-4-indanyl ethyl ketone 5,6-diisopropylindan was prepared by di-isopropylation of indan, made by hydrogenation of redistilled commercially-available indene. Two thousand one hundred and twenty (2120) grams of 93% sulfuric acid, diluted with 67 g. of water was added over a 3 hour period to a cooled, well-stirred solution of 354 g. indan and 360 g. isopropyl alcohol while maintaining the reaction temperature at 5 to 15°. The mixture was then allowed to come to room temperature, with stirring overnight. The batch was quenched on 2000 g. cracked ice. The oil layer which formed on standing was taken up in benzene, washed, filtered and distilled first at atmospheric pressure, to remove most of the benzene, and then under vacuum. There was obtained 355 g. of the desired product, consisting principally of 5,6-diisopropylindan, a colorless liquid, B.P. 93° (2 mm.), $n_D^{20}$ 1.5193.

Propionylation of the above hydrocarbon, using the molar ratios and reaction conditions given in Example 1, produced, 5,6-diisopropyl-4-indanyl ethyl ketone, a colorless liquid, B.P. 134–135°, $n_D^{20}$ 1.5230. The infrared spectrum shows the following characteristic bands (.025 mm. cell): 3.41 s., 5.89 s., 6.23 m., 6.34 m.w., 6.85 s., 7.11 s., 7.24 s., 7.34 s., 7.44 s., 7.65 m., 7.74 m., 8.10 m.s., 8.28 m.s., 8.44 w., 8.63 w., 9.05 s., 9.23 s., 9.62 s., 10.08 w., 10.40 w., 10.77 m.s., 11.35 s., 12.33 m.w., 12.85 w., 13.37 w., 14.10 w. microns.

This product shows activity as a plant-growth regulant and pre-emergence herbicide.

EXAMPLE 40

1,1-dimethyl-5-sec. hexyl-6-isopropyl-4-indanyl ethyl ketone

A solution of 210 g. of 93% sulfuric acid diluted with 7 g. of water was slowly added to a cool well-stirred solution of 500 g. of 1,1-dimethyl-6-isopropylindan and 100 g. of 1-hexene over a 3 hour period. The temperature was maintained at 0 to 10° throughout. The solution was then allowed to come to room temperature and stirred overnight. The batch was then quenched on 200 g. cracked ice, the separated oil washed and distilled. The desired 1,1-dimethyl-5-sec. hexyl-6-isopropylindan was obtained as a colorless liquid, B.P. 115° (2 mm.), $n_D^{20}$ 1.5018 amounting to 190 g. (69% theory).

Propionylation in the usual manner (See Examples 1 and 3) produced 1,1-dimethyl-5-sec. hexyl-6-isopropyl-4-indanyl ethyl ketone, a pale yellow liquid, moderately viscous, boiling point 150°/2 mm., $n_D^{20}$ 1.5110.

The infrared absorption spectrum shows the following characteristic bands (demountable cell): 3.38 s., 5.85 s., 6.22 m.w., 6.84 s., 7.07 m.w., 7.24 m., 7.32 m., 7.45 m.w., 7.58 w., 7.77 w., 8.06 w., 8.30 m.w., 8.57 w., 9.04 m., 9.15 m., 0.60 m.w., 10.13 w., 10.67 w., 10.67 w., 11.08 w., 11.37 m.w. and 12.37 w. microns.

Table II gives infrared absorption spectra for all of the compounds described in the foregoing detailed examples except for the compounds of Examples 3, 39 and 40. The infrared absorption data for the compounds of these three examples are given in said examples.

TABLE II.—INFRARED ABSORPTION BANDS IN MICRONS

| Ex. No. | S | MS | M | MW | W | Method |
|---|---|---|---|---|---|---|
| 1 | 3.45, 3.53, 5.91, 7.07, 7.44, 7.90, 8.76. | 6.93, 7.27, 7.38 | 7.60, 8.59, 9.80 | 6.32, 8.13, 9.07, 10.10 | 2.35, 3.30, 7.20, 8.33, 8.43 | As is. |
| 2 | 3.37, 5.87 | 3.47, 6.85, 7.34, 7.39, 8.02 | 7.24, 7.92, 8.19, 8.93, 9.15, 11.35. | 6.25, 7.05, 7.15, 7.65, 7.80, 8.57, 12.56. | 6.40, 9.50, 10.15, 11.05, 12.65. | As is. |
| 4, 5 | 3.41, 3.47, 5.89, 6.90, 7.10, 7.41, 8.00. | 7.25, 11.52 | 6.21, 6.33, 7.62, 9.07, 9.80, 10.14, 10.54. | 8.30, 8.74, 11.27, 12.76, 14.55. | 2.89, 5.25, 11.06, 12.94, 13.42. | As is. |
|  | 3.40, 3.45, 5.87, 6.90, 7.05, 7.39, 8.04, 8.10, 8.73. | 7.24, 7.56, 7.60, 7.74, 7.88, 8.62, 11.41. | 3.08, 6.23, 6.35, 8.27, 8.42, 8.99, 9.05, 9.60, 9.83, 10.07, 10.37. | 10.65, 11.77, 14.70 | 12.27, 12.75, 12.93, 13.30, 14.26. | As is. |
| 6 | 3.40, 3.46, 5.90, 5.95, 6.87, 7.35, 7.40, 7.75, 8.05, 8.54 | 6.33, 7.23, 7.25, 7.58, 7.83, 8.39, 8.86, 10.62, 11.48. | 6.24, 8.30, 9.05, 9.60, 9.70, 14.70. | 9.90, 10.05, 11.15, 13.00, 13.57. | 2.85, 2.97, 3.66, 4.35, 10.30, 12.50. | As is. |
| 7 | 3.40, 3.46, 5.88, 6.87, 7.40, 8.00, 8.94. | 7.06, 7.25, 8.13, 11.44 | 6.22, 6.34, 7.63, 7.83 | 8.28, 8.55, 8.75, 9.07, 9.33, 9.46, 9.68, 10.30, 10.50, 10.88, 12.80, 14.54. | 2.94, 10.14, 12.27 | As is. |
| 8 | 3.40, 3.45, 5.87, 6.85, 6.88, 8.16, 9.06. | 7.09, 7.25, 7.28, 7.45, 10.67, 10.76, 11.51. | 6.20, 6.32, 7.57, 8.06, 9.91, 10.10, 11.10, 12.37. | 2.82, 8.65, 8.75, 8.90, 9.47, 9.73, 12.85, 13.95. | 2.94, 3.63, 8.48, 13.30, 13.55. | As is. |
| 9 | 3.42, 5.95, 6.90, 7.46, 8.63, 9.01, 10.75. | 7.08, 7.23, 7.26, 7.34, 7.59, 7.78, 7.86, 8.10, 9.43, 11.47, 12.37. | 6.24, 6.33, 8.41, 9.64, 10.30, 11.18, 12.51, 14.35. | 8.30, 9.90, 10.05 | 2.97, 12.95, 13.61 | As is. |
| 10 | 3.40, 3.45, 5.90, 6.87, 8.17, 8.93. | 7.07, 7.25, 7.33, 7.41, 7.62, 8.25, 9.05, 11.43. | 6.23, 6.35, 7.77, 7.95, 8.43, 8.75, 9.43, 9.73, 9.90, 10.06, 10.39, 10.67, 10.80, 11.13, 12.35. | 3.65, 11.83, 12.04, 12.72, 14.30. | 2.95 | As is. |
| 11 | 3.40, 3.45, 5.87, 6.88, 7.07, 7.35, 7.40, 7.96, 8.02, 8.92. | 6.82, 7.24, 7.27, 11.54 | 6.20, 10.18, 10.54 | 6.33, 7.79, 8.23, 8.28, 9.09, 9.81, 10.10, 13.26, 14.59. | 2.94, 3.12, 7.64, 8.53, 8.60, 9.24, 12.40, 12.65. | As is. |
| 12 | 3.36, 3.43, 5.87, 6.80, 6.87, 7.34, 7.37, 8.12. | 6.88, 7.20, 7.25, 7.57, 7.75, 8.22, 11.46. | 6.21, 6.38, 7.94, 8.05, 8.84, 10.04, 10.33. | 5.62, 9.54, 9.57, 9.83, 11.22, 14.65. | 2.93, 9.06, 9.21, 10.65, 11.80, 13.21, 13.37, 13.60, 14.30. | As is. |

TABLE II—Continued

| Ex. No. | S | MS | M | MW | W | Method |
|---|---|---|---|---|---|---|
| 13 | 3.45, 3.52, 5.89, 7.36, 7.41, 8.02, 8.94. | 6.82, 6.86, 7.07, 7.26, 8.14, 11.40. | 6.23, 6.32, 6.35, 9.07, 10.20, 10.56. | 5.71, 7.62, 7.69, 7.80, 8.34, 8.63, 9.35, 9.68, 10.43, 11.20, 12.78, 14.44. | 3.0, 8.74, 9.96, 11.05, 13.16. | As is. |
| 14 | 3.38, 3.45, 5.95, 7.74, 11.17. | 6.87, 7.32, 8.04 | 6.23, 6.37, 7.23, 7.36, 7.60, 8.33, 8.39, 8.47, 8.86, 9.04, 9.28, 9.61, 10.05, 14.75, 15.07. | 6.09, 9.86, 10.41, 10.58, 13.34. | 7.16, 8.66, 10.85, 11.06, 12.96. | As is. |
| 15 | 3.45, 3.52, 5.92, 6.88, 7.37, 7.43, 7.95, 8.06, 8.92. | 7.07, 7.30, 8.16, 9.45, 11.42. | 6.05, 6.25, 6.37, 7.65, 7.80, 8.27, 8.75, 9.07, 9.29, 10.38, 12.32. | 5.73, 10.06, 10.95, 12.75, 13.20, 14.37, 15.00. | 3.00, 3.19, 8.57, 9.80, 10.78. | As is. |
| 16 | 3.45, 5.83, 5.88, 6.90, 7.11, 7.25, 7.35, 11.52. | 7.87, 8.20, 8.97, 10.00, 11.27. | 6.20, 6.32, 6.37, 7.60, 7.75, 8.06, 9.37, 10.46, 12.25. | 8.75, 12.95 | 2.94, 9.20, 10.74, 13.17, 13.42, 13.66. | As is. |
| 17 | 3.45, 5.87, 6.89, 7.23, 8.16, 9.35, 10.01, 10.54. | 7.08, 7.33, 8.06, 11.50, 11.58. | 6.20, 6.32, 7.48, 7.57, 7.75, 9.05, 9.17, 9.74, 10.72. | 8.75, 11.02, 12.65, 12.92 | 2.94, 13.67, 14.00 | As is. |
| 18 | 3.38, 3.44, 5.92, 6.87, 8.61 | 7.24, 7.34, 7.57, 7.68, 7.75, 7.80, 8.07, 8.93, 11.55. | 6.24, 6.32, 8.40, 9.04, 9.27, 9.62, 10.46, 11.19, 12.77. | 8.27, 9.86, 12.11, 13.27, 13.85. | 2.93, 7.12, 10.04 | As is. |
| 19 | 3.40, 3.46, 5.93, 6.85, 9.27, 10.55. | 7.25, 7.34, 8.07, 8.67 | 6.25, 6.34, 6.38, 7.46, 7.60, 7.78, 7.87, 9.06, 9.63, 11.43, 11.64, 12.59. | 8.30, 8.40, 8.53, 9.87, 10.31, 10.80, 11.14, 12.94, 13.16. | 2.97, 3.67, 6.49, 10.05, 13.80, 14.65. | As is. |
| 20 | 3.40, 5.90, 6.88, 7.25, 7.35 | 7.11, 7.56, 7.62, 7.88, 8.20, 8.26, 8.90, 10.02, 10.14, 11.42. | 6.23, 6.36, 7.75, 8.06, 8.75, 9.04, 9.26, 9.39, 9.75, 9.86, 11.20, 12.67. | 8.44, 10.32, 12.30, 12.87, 13.36, 13.86. | 2.95, 3.64, 10.64 | As is. |
| 21 | 3.40, 3.45, 5.92, 6.85, 7.42, 9.25. | 7.34, 8.17, 9.05, 10.02, 10.19, 11.42. | 6.23, 6.38, 7.10, 7.45, 7.63, 7.76, 7.91, 8.76, 9.75, 9.85, 10.37, 10.55, 12.33, 12.40. | 8.42, 10.82, 11.85, 12.87, 13.37. | 2.95, 3.13, 3.65, 5.50 | As is. |
| 22 | 3.43, 5.85, 5.89, 6.87, 6.99, 7.11, 7.26, 7.35, 7.45, 8.94, 11.22. | 7.59, 7.89, 7.95, 9.04, 9.64, 9.87, 10.64. | 6.28, 8.13, 8.63, 8.74, 9.25, 9.46, 10.20, 10.34, 10.78, 11.69, 12.50, 14.75. | 2.28, 2.94, 3.66, 8.30, 8.40, 12.75, 13.55, 13.68. | 2.44, 2.54, 13.15, 13.37 | As is. |
| 23 | 3.47, 3.53, 5.98, 6.89, 7.40, 7.79, 8.09. | 7.26, 7.35, 8.88, 11.33 | 6.25, 6.40, 8.46, 9.31, 9.72, 10.12, 13.62, 14.75. | 6.48, 8.35, 8.65, 9.06, 9.25, 10.40, 12.28. | 3.05, 5.67, 7.93, 12.98, 13.33. | As is. |
| 24 | 3.42, 3.48, 5.95, 6.88, 7.33, 7.40, 7.75, 7.80, 8.09. | 7.92, 8.89, 9.45, 11.33 | 6.25, 6.39, 7.17, 7.25, 7.62, 8.40, 8.54, 8.69, 9.99, 10.34, 10.45. | 9.06, 9.23, 9.87, 10.65, 12.41, 14.35, 15.05. | 2.99, 3.15, 10.77, 12.67, 13.09, 13.47. | As is. |
| 25 | 3.50, 5.96, 6.89, 6.96, 7.38, 7.42, 7.79, 8.10, 8.90. | 7.25, 7.61, 7.98, 8.56, 11.50, 15.10. | 6.26, 6.40, 8.40, 9.06, 9.60, 9.74, 10.11, 10.50, 10.63, 14.70, 14.94. | 8.31, 9.93, 10.80, 11.12, 13.55. | 3.72, 5.28, 12.55, 13.04 | As is. |
| 26 | 3.45, 3.54, 5.90, 6.90, 7.11, 7.43, 8.01, 8.93. | 7.28, 7.38, 11.53 | 6.24, 7.62, 8.16, 8.86, 10.14, 10.54, 15.18. | 6.35, 7.78, 8.25, 8.32, 8.57, 8.75, 9.09, 9.76, 14.55. | 3.01, 3.72, 3.95, 5.27, 8.64, 12.77, 12.95, 13.40. | As is. |
| 27 | 3.45, 3.54, 5.95, 6.88, 6.93, 7.42, 8.08, 8.62. | 7.04, 7.12, 7.27, 7.58, 7.80, 7.85, 7.91, 8.14, 8.59. | 6.25, 6.38, 8.30, 8.82, 9.90, 10.40, 11.45. | 9.08, 9.58, 9.75, 10.10, 10.23, 10.95, 11.06, 11.25, 13.49, 14.72. | 3.04, 3.72, 9.38, 12.71, 12.95, 13.13, 13.77, 14.25. | As is. |
| 28 | 3.38, 3.45, 5.86, 6.84, 6.98, 7.13, 7.24, 7.34, 8.88. | 7.85, 9.84, 10.05 | 7.56, 7.76, 7.95, 8.74, 9.04, 9.25, 9.40, 9.61, 11.27. | 6.26, 8.12, 8.27, 8.62, 10.29, 10.50, 11.50, 12.28, 12.87, 13.01, 13.40. | 2.92, 3.64, 8.38, 10.78, 11.00, 11.82, 13.85, 14.33. | As is. |
| 29 | 3.45, 5.88, 6.82, 6.88, 6.96, 7.23, 9.24, 10.09. | 7.33, 7.93, 9.00, 9.33, 9.85, 10.55. | 6.28, 7.13, 7.46, 7.56, 7.75, 8.11, 9.62, 10.27, 10.76, 11.06, 11.64. | 8.27, 8.36, 8.50, 8.63, 11.48, 11.88, 12.83, 12.95, 13.09, 13.55. | 2.93 | As is. |
| 30 | 3.40, 3.45, 5.88, 7.38 | 6.80, 6.86, 7.90, 8.72 | 6.00, 7.00, 7.26, 7.50, 7.60, 7.80, 8.10, 8.58, 9.45. | 8.26, 8.87, 9.06, 9.27, 9.35, 10.40, 11.15, 11.35, 12.05, 12.27. | 2.93, 6.23, 6.32, 9.90, 10.75, 12.56, 14.00, 14.30. | As is. |
| 31 | 3.40, 3.46, 5.98 | 6.87, 7.13, 7.34 | 7.25, 8.20, 8.30, 8.96, 9.11, 9.52, 9.75, 11.27, 11.35. | 6.24, 7.65, 7.88, 8.07, 8.58, 9.15, 10.54, 11.33. | 6.38, 9.34, 10.08, 11.63, 11.90, 12.74, 13.00. | KBr. |
| 32 | 3.36, 3.44, 5.88, 6.82 | 7.22, 7.32, 9.77 | 8.06, 8.23, 8.32, 9.14, 10.56, 11.36. | 6.23, 6.36, 7.06, 8.54, 8.61, 8.75, 9.34, 9.58, 10.99, 11.89. | 7.45, 7.60, 7.76, 10.06, 11.65, 12.32, 12.70, 13.35, 13.83. | As is. |
| 33 | 3.46, 5.89, 6.82, 6.89, 7.08, 7.25, 7.45, 8.21, 9.06. | 7.34, 8.06, 11.44 | 6.21, 6.32, 7.60, 9.44, 9.50, 9.64, 9.82, 10.26, 10.56, 10.73, 10.88, 11.13. | 8.63, 8.74, 12.12, 12.38, 12.65, 12.82, 14.00. | 2.95 | As is. |
| 34 | 3.45, 5.90, 6.90 | 7.10, 7.27, 7.35, 7.48, 8.27, 9.04, 11.44. | 6.24, 7.64, 8.00, 8.12, 8.77, 9.47, 9.70, 10.43, 11.10, 12.73. | 5.68, 6.35, 12.16, 14.02 | 6.48, 9.92 | As is. |
| 35 | 3.40, 5.86, 6.83, 6.87, 9.06. | 6.95, 7.02, 7.09, 7.24, 7.34, 7.40, 8.04, 8.21, 11.06. | 8.31, 10.70 | 6.19, 6.31, 8.57, 8.73, 9.35, 9.50, 10.15, 12.42, 12.85. | 5.50, 7.58, 7.67, 9.92, 11.53, 13.24, 13.90. | KBr. |
| 36 | 3.50, 3.55, 5.99, 6.92, 7.30, 7.42, 7.80, 8.17, 11.37. | 6.21, 6.42, 7.89 | 7.61, 8.51, 8.71, 8.90, 8.96, 9.25, 9.68, 10.10, 10.15, 10.44, 10.96, 14.76. | 5.70, 10.85, 12.86 | 3.05, 12.41, 13.17, 13.50, 14.16. | As is. |
| 37 | 3.40, 5.90, 6.20, 6.95, 7.38, 7.85, 8.00, 8.86, 11.58. | 6.31, 7.16, 7.24, 8.17, 9.67, 10.45. | 7.58, 8.46, 9.80, 9.94, 10.68, 11.35. | 3.64, 10.95, 13.68 | 2.95, 12.24, 14.38 | As is. |
| 38 | 3.38, 3.45, 5.86, 8.59 | 6.93, 7.03, 7.38 | 6.84, 7.24, 7.55, 7.72, 7.94, 10.53. | 6.00, 6.50, 9.96, 10.13 | 2.93, 3.63, 6.73, 8.23, 9.42, 9.55, 9.68. | As is. |

The herbicidal activity of the compounds of this invention is given in Table III, wherein the observed activity rating on two or more of the weed varieties included in the tests as set forth on page 4, supra, is reported as the percent control of growth.

TABLE III

| Compound of Example No. | Compound | Percent Total Control of Weeds |
|---|---|---|
| Check | | 0 |
| 1 | 1,1,4,6,7-pentamethyl-5-indanyl methyl ketone | 100 |
| 2 | 4,6-diisopropyl-1,1-dimethyl-5-indanyl methyl ketone and isomer | 100 |
| 3 | 4,6-diisopropyl-1,1-dimethyl-5-(and 7)-indanyl ethyl ketones | 100 |
| 4 | 1,1,4,6-tetramethyl-5-indanyl methyl ketone | 100 |
| 5 | 1,1,5,6-tetramethyl-4-indanyl methyl ketone | 95 |
| 6 | 1,1,4,7-tetramethyl-6-indanyl methyl ketone | 95 |
| 7 | 1,1,4-trimethyl-6-ethyl-5-indanyl methyl ketone | 100 |
| 8 | 1,1,4,6-tetramethyl-5-indanyl ethyl ketone | 100 |
| 9 | 1,1,4,7-tetramethyl-5-indanyl ethyl ketone | 100 |
| 10 | 1,1,5,6-tetramethyl-4-indanyl ethyl ketone | 100 |
| 11 | 1,1,2,4,6-pentamethyl-5-indanyl methyl ketone | 100 |
| 12 | 1,1,2,5,6-pentamethyl-4-indanyl methyl ketone | 100 |
| 13 | 1,1,4-trimethyl 6-isopropyl-5-indanyl methyl ketone | 100 |
| 14 | 1,1,4-trimethy -7-isopropyl-5-indanyl methyl ketone | 100 |
| 15 | 1,1-dimethyl-4,7-diethyl-5-indanyl methyl ketone | 100 |
| 16 | 1,1,4,6-tetramethyl-5-indanyl propyl ketone | 100 |
| 17 | 1,1,4,6-tetramethyl-5-indanyl isopropyl ketone | 100 |
| 18 | 1,1,4,7-tetramethyl-5-indanyl propyl ketone | 95 |
| 19 | 1,1,4,7-tetramethyl-5-indanyl isopropyl ketone | 100 |
| 20 | 1,1,5,6-tetramethyl-4-indanyl propyl ketone | 95 |
| 21 | 1,1,5,6-tetramethyl-4-indanyl isopropyl ketone | 95 |
| 22 | 1,1,4,6,7-pentamethyl-5-indanyl ethyl ketone | 100 |
| 23 | 1,1,2,4-tetramethyl-7-isopropyl-5-indanyl methyl ketone | 100 |
| 24 | 1,1-dimethyl-4-ethyl-7-isopropyl-5-indanyl methyl ketone | 100 |
| 25 | 1,1,4,7-tetramethyl-6-isopropyl-5-indanyl methyl ketone | 100 |
| 26 | 1,1,4,6-tetramethyl-7-isopropyl-5-indanyl methyl ketone | 100 |
| 27 | 1,1,6,7-tetramethyl-4-isopropyl-5-indanyl methyl ketone | 100 |
| 28 | 1,1,4,6,7-pentamethyl-5-indanyl propyl ketone | 100 |
| 29 | 1,1,4,6,7-pentamethyl-5-indanyl isopropyl ketone | 100 |
| 30 | 1,1-dimethyl-4,6,7-triethyl-5-indanyl methyl ketone | 100 |
| 31 | 1,1-dimethyl-4,6-diisopropyl-5-indanyl propyl ketone | 100 |
| 32 | 1,1-dimethyl-4,6-diisopropyl-5-indanyl isopropyl ketone | 100 |
| 33 | 1,1,4-trimethyl-6-ethyl-5-indanyl ethyl ketone | 100 |
| 34 | 1,1-dimethyl-4,6-diethyl-5-indanyl ethyl ketone | 100 |
| 35 | 1,1,4-trimethyl-6-isopropyl-5-indanyl methyl ketone | 100 |
| 36 | 1,4-dimethyl-1-ethyl-7-isopropyl-5-indanyl methyl ketone | 100 |
| 37 | 4,6-dimethyl-5-indanyl methyl ketone | 95 |
| 38 | 4,6,7-trimethyl-5-indanyl methyl ketone | 100 |
| 39 | 5,6-diisopropyl-4-indanyl ethyl ketone | 100 |
| 40 | 1,5-dimethyl-5-sec. hexyl-6-isopropyl-4-indanyl ethyl ketone | 100 |

For practical use as herbicides, the compounds of this invention may be formulated with conventional agricultural carriers to obtain the desired concentration and to facilitate handling. For example, these compounds may be formulated into dusts by combining them with such materials as talc or clays. Wettable powder formulations may be obtained by adding a dispersing or suspending agent to the dust formulations referred to above.

If desired, the compounds of this invention may be applied as spray solutions which can be prepared by dissolving the compounds in suitable solvents, such as water, xylene, methylated naphthalenes, kerosenes, common agricultural oils, etc. in accordance with well established agricultural practices. The choice of solvent to be used will be dictated by the solubility of the compound sought to be sprayed in that particular solvent system. Generally, it has been found that the majority of these compounds have a relatively low order of water solubility, so that the use of common agricultural organic solvents is the preferred practice.

The compounds of this invention may also be emulsified or suspended in water by adding wetting agents or emulsifying agents to aqueous systems containing one or more of the chemical compounds falling under this disclosure. These emulsified formulations are suitable for use in spraying directly upon the locus sought to be protected from undesirable vegetation. So far as has been determined no significant difference in effect is realized from the use of aqueous emulsified formulations or from organic solvent solutions of these herbicides, providing, of course, that a similar amount of chemical is employed in each instance of use.

So far as concerns the amount of herbicide to be used, that is, of course, subject to such considerations as the type of treatment to be made, the area to be treated, the type of weeds sought to be controlled and the stage of development of the species being sprayed. Generally, however, concentrated herbicidal compositions of the present invention are prepared so as to contain from 5 to about 60% of the active herbicidal component. Compositions which are suitable for "as is" application generally contain from 0.1% to about 10% of active herbicidal component.

Preferred compounds of this invention, being highly active herbicides, may be used at relatively low concentrations as may be seen from the following results:

EXAMPLE 41

A water-ethanol solution of 1,1-dimethyl-4,6-diisopropyl-5-indanylmethylketone was sprayed over soil which was freshly sown to crabgrass (*Digitaria ischaemum*), ryegrass (*Lolium perenne*), barnyard grass (*Echinochloa crusgalli*), Johnson grass (*Sorghum halepense*), witchgrass (*Panicum capillare*), cheat grass (*Bromus secalinus*), wild oats (*Avena fatua*) and foxtail (*Setaria faberii*) seeds. Spraying was effected at a rate equivalent to 3 lbs. of the active herbicidal agent per acre of soil surface. Approximately 2½ weeks after spraying, an inspection of the treated area showed 90 to 100% control of these undesirable grass species as compared to untreated areas.

EXAMPLE 42

1,1 - dimethyl - 4 - ethyl - 7 - isopropyl - 5 - indanylmethylketone, dissolved in a methylated naphthalene-alcohol solution, was sprayed over soil which had been sown to wild oats (*Avena fatua*), crabgrass (*Digitaria ishaemum*), barnyard grass (*Echinochloa crusgalli*) and foxtail (*Setaria faberii*) at such a rate so as to apply the equivalent of 4 lbs. of the herbicidal agent per acre of soil surface. Three weeks after spray application the treated area was inspected and from 90 to 100% control was observed for these weed species as compared to untreated areas.

EXAMPLE 43

An aqueous oil emulsion of 1,1-dimethyl-4,6-diisopropyl-5-indanylethylketone was sprayed over soil which had been sown to wild oats (*Avena fatua*), crabgrass (*Digitaria ischaemum*) foxtail (*Setaria faberii*), barnyard grass (*Echinochloa crusgalli*) and cheat grass (*Bromus secalinus*). Spraying was effected so as to apply the equivalent of 4 lbs. of the chemical compound per acre of soil surface, and at the time of spraying there were no plants growing within the treated area. Approximately 3 weeks after spray application an inspection of the treated area revealed that from 95 to 100% control was obtained over undesirable plant species in comparison with untreated or control areas.

EXAMPLE 44

Field plots were planted with both rice and barnyard grass (*Echinochloa crusgalli*) seeds and were immediately sprayed with aqueous suspensions of 1,1-dimethyl-4,6-diisopropyl-5-indanylethylketone at a rate comparable to 3 pounds of the active chemical agent per acre of soil surface. Approximately 12 weeks after spraying an inspection of the treated area showed that 95% control had been obtained over the barnyard grass with no noticeable injury to the rice crop.

EXAMPLE 45

Field plots of transplanted paddy rice were seeded with barnyard grass (*Echinochloa crusgalli*) and were then sprayed with aqueous emulsions of 1,1-dimethyl-4,6-diisopropyl-5-indanylethylketone so as to yield an application rate comparable to 2 pounds of the active chemical agent per acre of soil surface. The rice plants were approximately eight inches in height at the time of spraying and many of them had 3 to 4 inch tillers. Seven weeks after application of the chemical herbicide an inspection of the treated plots showed 100% control over barnyard grass (*Echinochloa crusgalli*) with no noticeable injury to the rice plants.

If it is desired to effect substantially complete elimination of vegetation through the use of one or more compounds of this invention, it is then necessary to apply a higher rate of the chemical agent, for example from 20 to 40 lbs./acre thereof, so as to obtain substantial soil sterilization.

Effective aquatic weed control can be accomplished by very low concentrations of the herbicidal compounds of the present invention as may be demonstrated by the following results:

EXAMPLE 46

The following compounds were each applied to water wherein there was growing emerged aquatic weeds of the water fern (*Salvinia rotundifolia*) species. Each of the compounds was applied so as to obtain a rate of 10 parts of the active chemical agent per 1 million parts of water:

Compound A—1,1,4,7-tetramethyl-6-isopropyl-5- indanylmethylketone.
Compound B—1,1,4,5-tetramethyl-7-isopropyl-6-indanylmethylketone.
Compound C—1,1,4,6,7-pentamethyl-5-indanylmethylketone.
Compound D—1,1,5,6-tetramethyl-4-indanylethylketone.
Compound E—1,1,4,6-tetramethyl-5-indanylethylketone.
Compound F—1,1,4,7-tetramethyl-5-indanylethylketone.

Approximately three weeks after introducing the compounds to the aqueous systems containing the waterfern plants, an inspection revealed that from 90 to 100% control was being obtained over the weed species.

EXAMPLE 47

A rate of 10 parts of 1,1,6-trimethyl-4-ethyl-5-indanylmethylketone was added to each million parts of water wherein there was growing submerged aquatic weeds of the species *Elodea canadensis*.

Three weeks after adding this compound to the water an inspection revealed that 90% control over the undesirable aquatic weed had been obtained.

Examples 41 to 47, inclusive, were repeated, employing the other compounds of this invention in place of those mentioned in said examples. Similar results as those noted in said examples were obtained.

The foregoing illustrates the practice of this invention which, however, is not to be limited thereby but is to be construed as broadly as permissible in view of the prior art and limited solely by the appended claims.

We claim:
1. A compound having the formula:

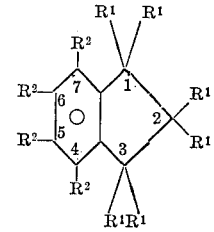

wherein $R^1$ is selected from the group consisting of H and alkyl radicals from 1–3 carbon atoms, with the proviso that at least one of the $R^1$'s is H, and wherein $R^2$ is selected from the group consisting of H, alkyl radicals having from 1 to 6 carbon atoms and acyl radicals derived from alkanoic acids having from 2–5 carbon atoms, with the proviso that at least one of the $R^2$ radicals must be an acyl radical and the maximum number of $R^2$'s which are H is 1, and with the further proviso that if carbons 1 and 3 are both quaternary, then carbons 4 and 7 are both free of any acyl group.

2. 1,1-dimethyl-4,6-diisopropyl-5-indanylethyl ketone.
3. 1,1-dimethyl-4,6-diisopropyl-7-indanylethyl ketone.
4. 1,1,6-trimethyl-4-ethyl-5-indanylethyl ketone
5. 1,1,2,4,6-pentamethyl-5-indanylmethyl ketone.
6. 1,1,4,6-tetramethyl-5-indanylethyl ketone.
7. 1,1-dimethyl-4,6-diisopropyl-5-indanylisopropyl ketone.
8. 1,1,4-trimethyl-6-isopropyl-5-indanylethyl ketone.

References Cited

FOREIGN PATENTS 796,585 6/1958 Great Britain.
796,586 6/1958 Great Britain.

DANIEL D. HORWITZ, Primary Examiner

U.S. Cl. X.R.

71—123; 252—522